July 22, 1924.　　　E. P. ARMSTRONG　　　1,502,085
SAW SHARPENING MACHINE
Filed April 6, 1922　　　3 Sheets-Sheet 2
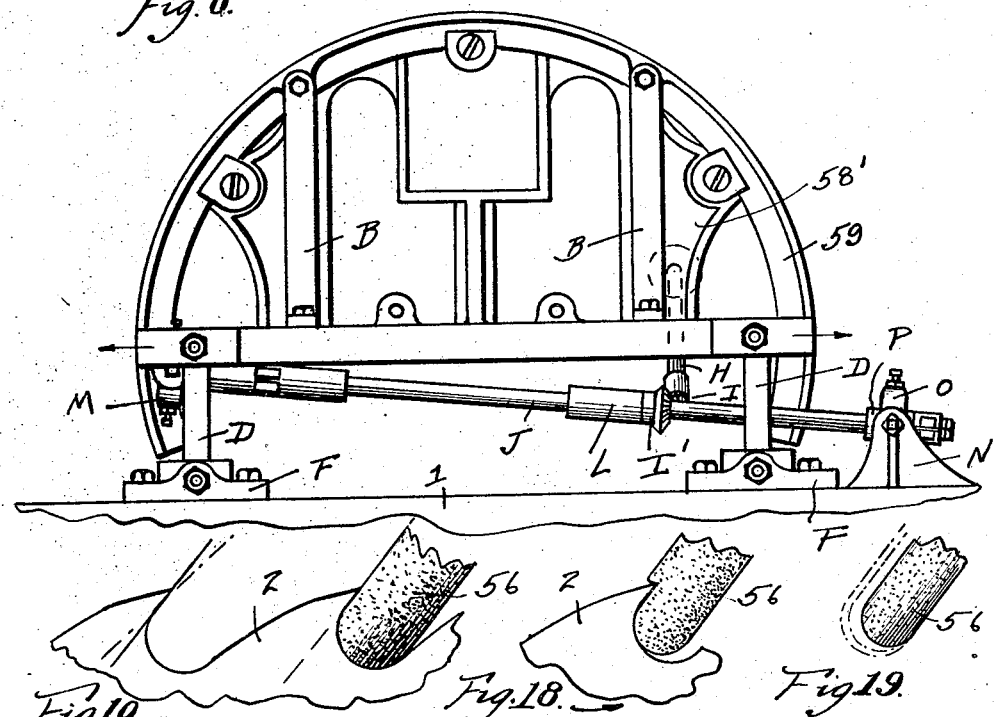
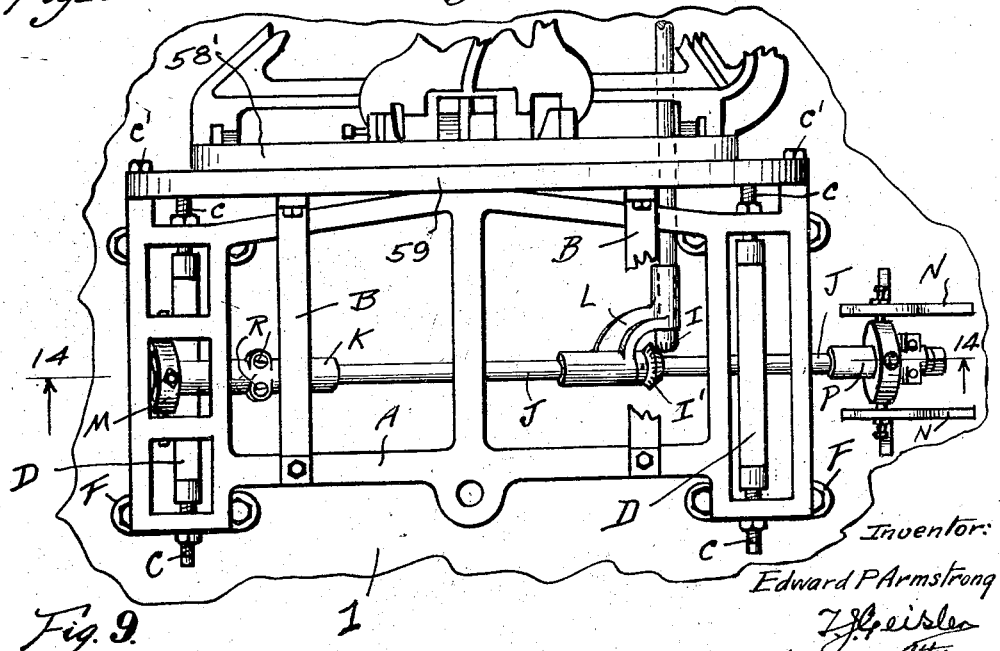
Inventor:
Edward P Armstrong July 22, 1924.   E. P. ARMSTRONG   1,502,085
SAW SHARPENING MACHINE
Filed April 6, 1922   3 Sheets-Sheet 3
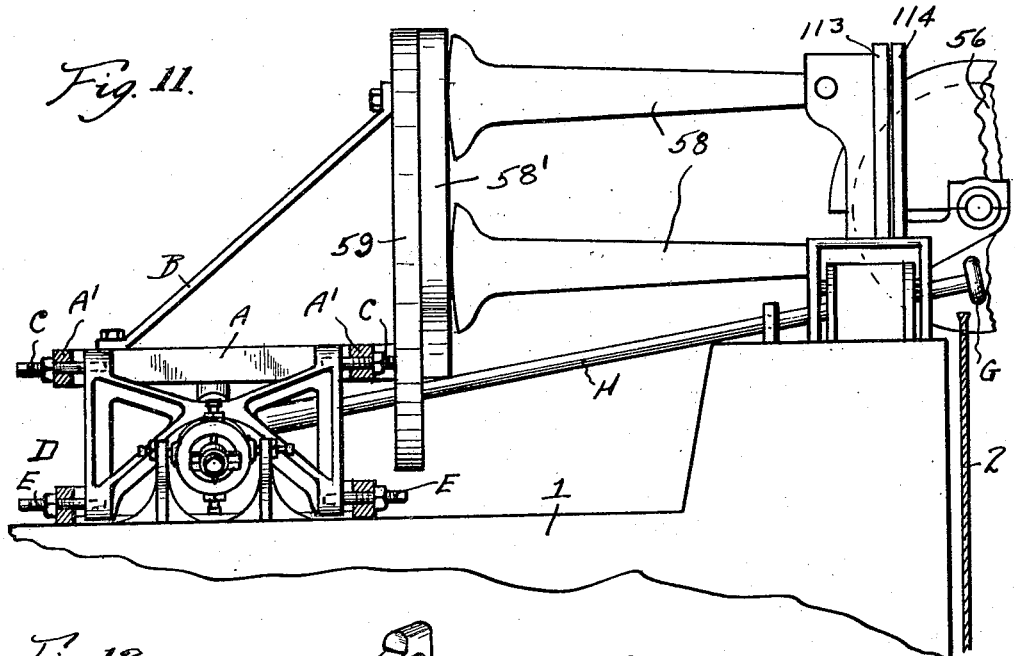
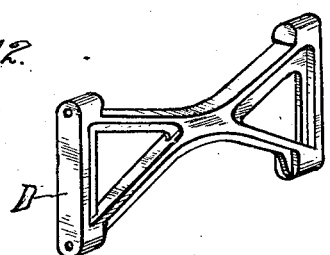
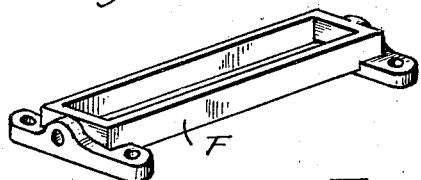
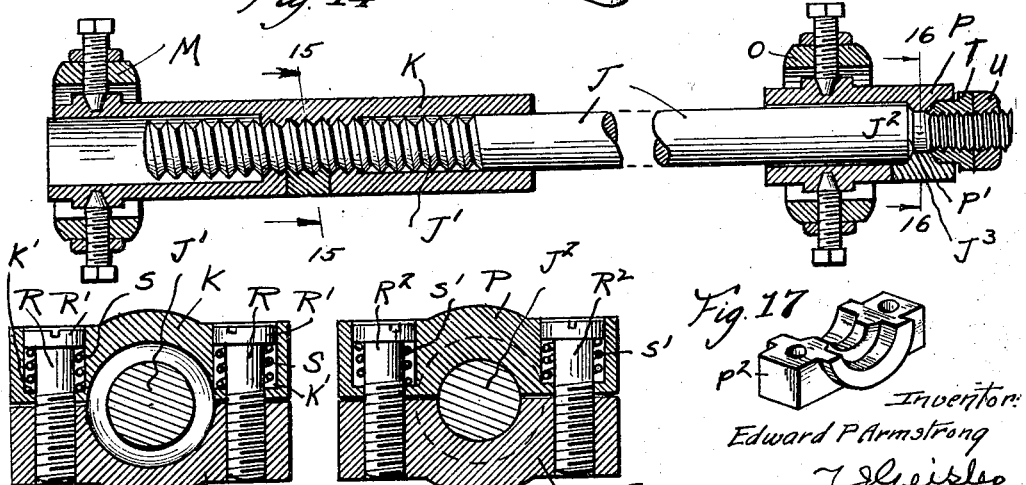
Inventor:
Edward P Armstrong
by    Atty.

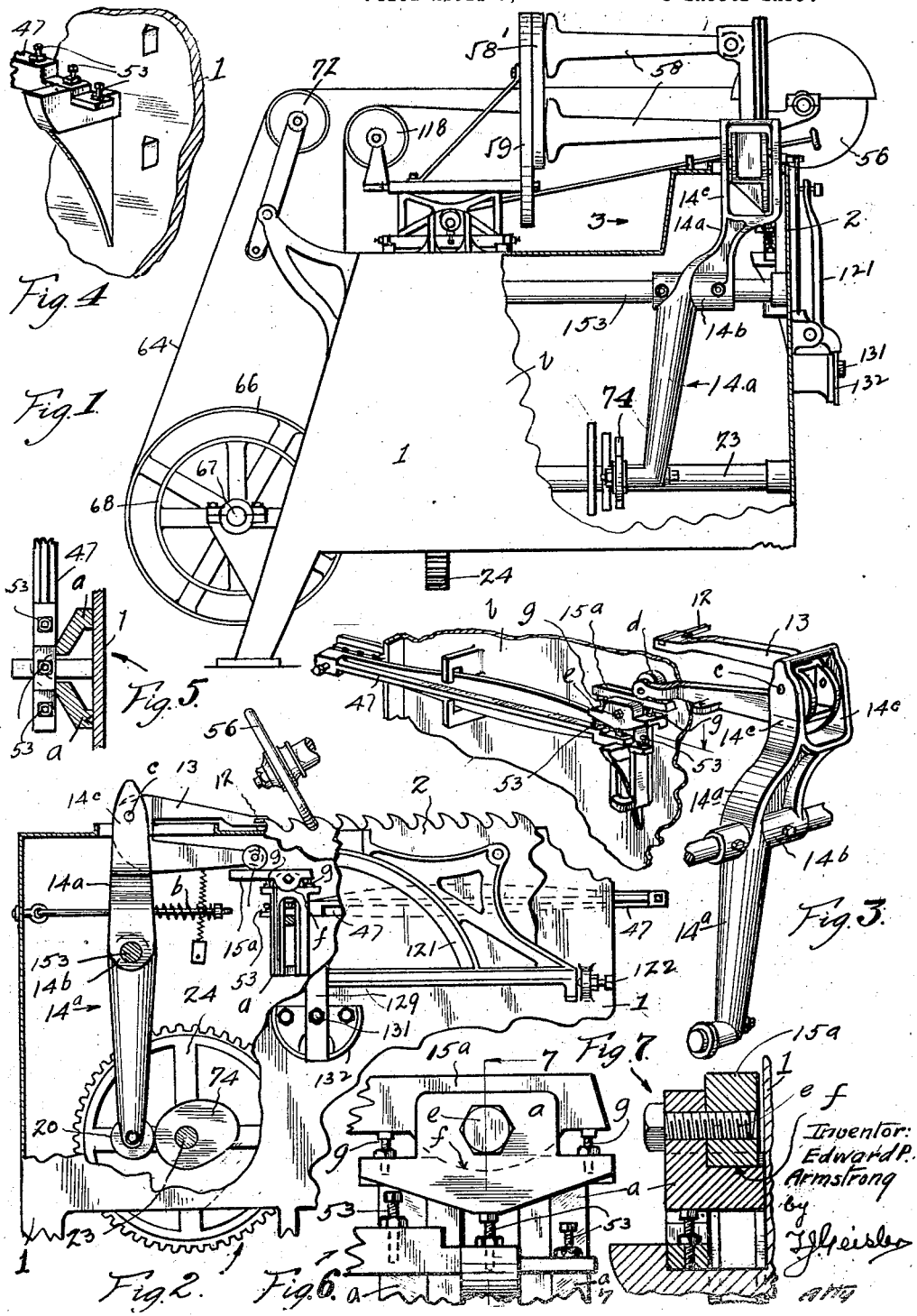

Patented July 22, 1924.

1,502,085

UNITED STATES PATENT OFFICE.

EDWARD P. ARMSTRONG, OF PORTLAND, OREGON.

SAW-SHARPENING MACHINE.

Application filed April 6, 1922. Serial No. 550,007.

*To all whom it may concern:*

Be it known that I, EDWARD P. ARMSTRONG, a citizen of the United States, and a resident of Portland, county of Multnomah, and State of Oregon, have invented a certain new and useful Improvement in Saw-Sharpening Machines, of which the following is a specification.

The object of my invention is to simplify and render more efficient and practical, in certain particulars, the automatic saw sharpener machine described in the application for Letters Patent of the U. S. of myself, and my son Henry W. Armstrong, filed Jan. 8, 1919, under Serial Number 270,209.

Referring to the devices described in the latter application, my present specific improvements are the substitution of a torque arm for the sliding carriage and its controlling mechanism which gives to the saw a progressive, horizontal, step by step motion which is imparted to the saw feeding finger, 12.

Another improvement involved in this application is the providing of an improved sliding and adjusting means for the arm 13 which is pivoted to the said torque arm and which was formerly connected to the carriage 14.

A further object is to provide an improved adjusting means for the grinder wheel 56 so that the operator can make a horizontal adjustment from in front of the saw in a positive accurate manner.

To facilitate the comprehension of my present improvement with regard to said other machine as described in said application, I have given the parts concerned with my improvements reference characters corresponding with those used in said application.

All these and other minor improvements I have shown in the accompanying drawings, in which:

Fig. 1 shows a fragmentary elevation of the left end of said saw sharpening machine, this view being of the opposite end to the one which is shown in the previous application as Fig. 3;

Fig. 2 is a fragmentary front elevation of said machine and corresponds to Fig. 1 of the previous application except that part of the front has been broken away to show my specific improvements;

Fig. 3 is a fragmentary perspective of the parts involved in my invention;

Fig. 4 is a fragmentary perspective showing a detail of construction;

Fig. 5 is a sectional view taken on the line 5 of Fig. 3;

Fig. 6 is a detail of mechanism by which adjustments can be made to the height and inclination of the track;

Fig. 7 is a section taken on the line 7—7 of Fig. 6;

Fig. 8 is a side elevation of the mechanism by which the grinder head can be adjusted horizontally;

Fig. 9 is a plan view with parts broken away of the mechanism shown in Fig. 8;

Fig. 10 is a diagrammatic representation of the position of the grinder in relation to the saw teeth;

Fig. 11 is an end elevation of the mechanism shown in Figs. 8 and 9 and shows how this mechanism is connected to the grinder head and its supporting frame;

Figs. 12 and 13 are perspective views of details of construction;

Fig. 14 is a section with parts broken away taken on the line 14—14 of Fig. 9 and shows the construction of the adjusting mechanism;

Fig. 15 is a section taken on the line 15—15 of Fig. 14;

Fig. 16 is a section taken on the line 16—16 of Fig. 14;

Fig. 17 is a perspective view showing a detail of construction; and

Figs. 18 and 19 are diagrammatic illustrations showing the effects of abrasion on the grinder wheel.

The construction and operation of the parts of my invention is as follows: The machine involved in my invention is used to grind the teeth of band saws accurately. The mechanism involves a frame, a grinding head and a feeding mechanism for the saw. When the grinder head is set in position it is designed to rotate in a fixed position and the saw is advanced to the grinder head by means of cam operated mechanism and therefore accurate grinding operation is dependent upon accurate and efficient feeding mechanism for the saw. This is the portion of the machine on which our first improvement is made.

Our second improvement involves a more efficient and more accurate means for adjusting the grinder head to the saw.

As noted in the specification in the previous application the saw number 2 is given a progressive horizontal step by step motion which is imparted by the saw feeding finger 12 (in Figs. 5 to 8 and 18). In this application the feed is given the saw in the following manner: As the driven gear 24 rotates the cam 74 moves about also because it is also fixed to the shaft 23 on which the drive gear is mounted. The cam follower 20 mounted on the torque arm 14 rides against the cam 74. As the cam 74 rotates the cam follower 20 and the torque arm $14^a$ oscillates. The torque arm $14^a$ is fulcrumed on the shaft 153 and the cam follower 20 is held against the cam 74 because the spring $b$ is fastened to the torque arm $14^a$ on the opposite sides of the fulcrum. The bearing $14^b$ of the torque arm $14^a$ is of substantial length so as to withstand all strain due to this torque effect of the cam.

The upper end of the torque arm $14^a$ is formed as a hollow box $14^c$ in which the arm 13 is pivoted as at $c$. The entire construction of this torque arm is designed to withstand any twisting effect around the bearing $14^b$, the lower half of the torque arm being made of substantial cross section and preferably hollow so as to reduce the weight. The portion of the torque arm above the bearing is made with an I-shaped cross section so that the lateral flanges will substantially prevent flexure. The saw feeding finger 12 is mounted in the upper leg of the arm 13 and the lower leg has a roller $d$ placed thereon to eliminate friction and to provide a more accurate movement of the saw feeding finger 12. This roller $d$ rides on an adjustable track $15^a$ which is pivoted as at $e$ and has a circular lower surface as $f$ so as to allow rotation about the shaft $e$ so as to allow inclination in the track $15^a$. The screws $g$ on both sides of the pivot $e$ can be adjusted to position this track in any degree of inclination. The arm 47 has adjusting means 53 placed therein as in the previous application and these bear on the track and raise the track and arm both instead of raising only the arm 13 as in my present improvement. The bracket $a$ is slidably mounted on the frame 1 which serves as a permanent support from which these adjustments can be made.

Other parts shown in this drawing which do not pertain to the invention but are the same as the previous application are as follows: The grinder 56, saw 2, gate 121 with its spring arm 129 fastened by bolt 131 and bearing on the arcuate surface 132 and 133. Cone shaped screws 122 serve as a pivot for the gate 121. In Fig. 1, starting from the left the following parts are readable on the drawings: Shaft 67, pulley 68, pulley 66, belt 64, idler pulley 72, adjustable pulley 118 and rocker arms 58.

The object mentioned in the introduction, namely, that of providing an improved adjusting means for the grinder wheel 56 so that the operator can make a horizontal adjustment from the front of the saw, is accomplished as follows:

The emery wheel 56 is mounted on the shaft 57, which in turn is supported by the wheel frame 114, which is supported by a face plate 113. These parts in turn are supported by rocker arms 58 similar to the rocker frame described in Patent No. 1,227,556, issued to E. P. Armstrong, May 22, 1917. The bracket 59 which supports the arms 58 is fixed to the auxiliary frame A and braced by means of members B. Except for the auxiliary frame A and the braces B all parts previously mentioned are old in the patent referred to in the introduction. This auxiliary frame carries pivot pins C fastened to the member 59 by bolts C'. The upright carriers D are pivoted on all four corners on the pivots C, and pivots E. These uprights are positioned so that the uprights can have arcuate movement around the pivots E. The pivots E are fixed in the bearing F which is fastened to the frame 1. Thus it can be seen that the grinder head will be given a corresponding movement as the movement of the auxiliary frame on the upright carriers D. The movement of the upright frames and therefore the auxiliary frame and grinding head is regulated by the operator thru the hand wheel G which is fixed to the rod H. On the end of the rod H is a gear element I which meshes with a corresponding gear I' fixed on the rod J. These two gears are held in mesh and supported with each other by the L-shaped bracket L. The gear I' is fastened to the rod J. Motion thru the rod J is transmitted to the nut K which is positioned and is moved by the thread J'. The nut K is fastened to the auxiliary frame A thru the universal joint M. The other end of the rod J is fastened to the bracket N thru the universal joint O. The end $J^2$ of this shaft J is journaled in the bearing P which is provided with a shoulder P' which cooperates with a shoulder $J^3$ on the rod J. These corresponding shoulders sustain any end thrust upon the bearing. It can be understood that any rotation of the rod J will transmit a similar movement to the nut K and that in turn will move the auxiliary frame A and thus will cause it to have arcuate movement around the upright members D. The threaded portion J' is made with a V-type thread and the nut K is slit longitudinally and a piece $K^2$ is removable and the parts of the nut are held together by screws R. The bearing P is similarly split and the piece P² is held by springs S' and screws R². These screws have a head R' and a spring S is positioned against the bottom of the recess K' in the nut K and against the head of the screw R and thus a constant pressure is maintained between the separate parts of the nut on the threaded portion J'. Any play that would result from continued wear can thus be taken up thru the nut K. As the internal threads on the nut K can be positioned further in on the threads J' on the rod J, the taper of the threads J' is enough to counterbalance the compressing effect of the springs S so that end thrust of the member J can not force the parts of the nut apart. Lock nuts T and U are positioned on the journal end of the shaft so as to take up end play.

In Figs. 10, 18 and 19, diagrammatic representations show the effect of a continued operation of the grinding wheel on the saw teeth.

In Fig. 18 the effects of a wheel being fed directly to the saw tooth is shown and in Fig. 19 the wheel has been reduced substantially due to the varied application of the wheel on the saw tooth. The effect shown in Fig. 19 is possible with the horizontal adjustment as shown inasmuch as the wheel can be tipped and the point fed in under the cutting bit of the tooth and thus the grinding wheel is worn down evenly.

I claim:

1. In a saw sharpening machine, a rocker-arm, a saw-feeding arm pivoted to one end of said rocker-arm, a housing through which said end of said rocker-arm projects, and a supporting surface located under and covered by said housing, said saw-feeding arm having a piece extending under said housing and sliding on said supporting surface.

2. In a saw sharpening machine, a rocker-arm, a saw-feeding arm pivoted to one end of said rocker-arm, a housing through which said end of said rocker-arm projects, and a supporting surface located under and covered by said housing, said saw-feeding arm having a piece extending under said housing and sliding on said supporting surface, the latter being adjustable to vary the lift and inclination of said saw-feeding arm.

3. In a saw sharpening machine, a vertical rocker-arm of substantial cross section so as to withstand torque, a saw-feeding arm pivoted to the upper end of said rocker-arm, a roller on the latter end of said saw feeding arm, a track on which said roller bears, such track being adjustable as to inclination and height, and means for oscillating said rocker arm.

4. In a saw sharpening machine, a vertical rocker arm of substantial cross section so as to withstand torque, a saw-feeding arm pivoted to the upper end of said rocker arm, an arm horizontally supported and adjustable on the frame, a bracket supporting the free end of such arm, a vertically movable piece, said piece being supported by the free end of said horizontal arm, a track horizontally pivoted on said piece, the saw feeding arm bearing on said track, and means for oscillating said rocker arm.

5. The combination set forth in claim 3 distinguished in that said horizontal arm is pivoted at one end and is longitudinally adjustable.

6. The combination set forth in claim 3 distinguished in that the said movable piece straddles said bracket.

7. The combination set forth in claim 3 distinguished in that the said movable piece straddles said bracket and includes means for holding such piece in vertical alinement.

8. The combination set forth in claim 3 distinguished in that it includes means for varying the inclination of said track relatively to said piece.

9. In a saw sharpening machine, a vertical rocker-arm of substantial cross section so as to withstand torque, a saw-feeding arm pivoted to the upper end of said rocker arm, an arm horizontally supported and adjustable on the frame, a bracket supporting the free end of such arm, a vertically movable piece, vertical set screws carried by the free end of said arm, said vertically movable piece being seated on said set screws, a track horizontally pivoted on said piece, means for varying the inclination of said track relatively to said piece, the saw feeding arm bearing on said track, and means for oscillating said rocker arm.

10. The combination set forth in claim 8 distinguished in that the free end of said horizontal arm is stepped and the set screws are carried by said steps.

11. The combination set forth in claim 8 further distinguished in that the saw feeding arm is provided with a roller and the latter bears on said track.

12. In a saw sharpening machine, means for supporting the grinding wheel at variable angles to the face of a tooth of a saw, a support for said means, such support being lineally movable, thereby to move the grinding wheel in the cavity of the tooth against the face to be ground, and means for moving the latter support.

13. In a saw sharpening machine, means for supporting the grinding wheel at variable angles to the face of a tooth of a saw, a support for said means, such support being lineally movable, thereby to move the grinding wheel in the cavity of the tooth against the face to be ground, and means for moving the latter support, the latter means being arranged to be operable from a point adjacent the grinding wheel.

14. In a saw sharpening machine, a main frame, upright carriers pivotally mounted thereon, another frame supported by said carriers, the latter frame carrying the grinding wheel, a nut provided on one of said uprights, a rod threaded at one end in said nut, the opposite end of said rod being journaled in a bracket carried by the main frame, means for rotating the rod, thereby to adjust the grinding wheel relatively to the work.

15. In a saw sharpening machine, a main frame, upright carriers pivotally mounted thereon, another frame supported by said carriers, the latter frame carrying the grinding wheel, a nut provided on one of said uprights, a rod threaded at one end in said nut, the opposite end of said rod being journaled in a bracket carried by the main frame, means for rotating the rod, said means being adapted to be operated from a distant point, thereby to adjust the grinding wheel relatively to the work.

16. In a machine of the character described, a main frame, upright carriers pivotally mounted thereon, another frame supported by said carriers, the latter frame carrying the grinding wheel, a nut provided on one of said uprights, a rod threaded at one end in said nut, the opposite end of said rod being journaled in a bearing provided on said main frame, the journaling means of said rod including devices for sustaining the end thrust imposed on the latter, said nut and said bearing of the rotatable rod being adapted to accommodate the arcuate movements of said upright carriers, and means for rotating said rod.

17. In a machine of the character described, a main frame, upright carriers pivotally mounted thereon, another frame supported by said carriers, the latter frame carrying the grinding wheel, a nut provided on one of said uprights, a rod threaded at one end in said nut, the opposite end of said rod being journaled in a bearing provided on said main frame, the journaling means of said rod including devices for sustaining the end thrust imposed on the latter, said devices being adjustable, said nut and said bearing of the rotatable rod being adapted to accommodate the arcuate movements of said upright carriers, and means for rotating said rod.

18. In a machine of the character described, a main frame, upright carriers pivotally mounted thereon, another frame supported by said carriers, the latter frame carrying the grinding wheel, a nut provided on one of said uprights, a rod having V-threads at one end, such end being threaded in said nut, said nut being split longitudinally, means holding said nut parts together, and thereby maintaining a constant pressure of the divided nut parts on the thread, the opposite end of said rod being journaled in a bearing provided on said main frame, said nut and said bearing of the rotatable rod being adapted to accommodate the arcuate movements of said upright carriers, and means for rotating said rod.

19. In a machine of the character described, a main frame, upright carriers pivotally mounted thereon, another frame supported by said carriers, the latter frame carrying the grinding wheel, a nut provided on one of said uprights, a rod having V-threads at one end, such end being threaded in said nut, said nut being split longitudinally, screws securing one part of such nut on the other, said screws being headed, springs on which the screw heads bear, thereby maintaining a constant pressure of the divided nut parts on the thread, the opposite end of said rod being journaled in a bearing provided on said main frame, said nut and said bearing of the rotatable rod being adapted to accommodate the arcuate movements of said upright carriers, and means for rotating said rod.

20. In a machine of the character described, a main frame, upright carriers pivotally mounted thereon, another frame supported by said carriers, the latter frame carrying the grinding wheel, a nut provided on one of said uprights, a rod having V-threads at one end, such end being threaded in said nut, said nut being split longitudinally, means holding said nut parts together, and thereby maintaining a constant pressure of the divided nut parts on the thread, the opposite end of said rod being journaled in a bearing provided on said main frame.

21. In a machine of the character described, a main frame, upright carriers pivotally mounted thereon, another frame supported by said carriers, the latter frame carrying the grinding wheel, a nut provided on one of said uprights, a rod having V-threads at one end, such end being threaded in said nut, said nut being split longitudinally, screws securing one part of such nut on the other, said screws being headed, springs on which the screw heads bear, thereby maintaining a constant pressure of the divided nut parts on the thread, the opposite end of said rod being journaled in a bearing provided on said main frame.

22. In a machine of the character described, a main frame, upright carriers pivotally mounted thereon, another frame supported by said carriers, the latter frame carrying the grinding wheel, a nut provided on one of said uprights, a rod having V-threads at one end, such end being threaded in said nut, said nut being split longitudinally, means holding said nut parts together, and thereby maintaining a constant pressure of the divided nut parts on the thread, the opposite end of said rod being journaled in a bearing provided on said main frame, the journaling means of said rod including devices for sustaining the end thrust imposed on the latter.

23. In a machine of the character described, a main frame, upright carriers pivotally mounted thereon, another frame supported by said carriers, the latter frame carrying the grinding wheel, a nut provided on one of said uprights, a rod having V-shaped threads at one end, such end being threaded in said nut, said nut being split longitudinally, screws securing one part of such nut on the other, said screws being headed, springs on which the screw heads bear, thereby maintaining a constant pressure of the divided nut parts on the thread, the opposite end of said rod being journaled in a bearing provided on said main frame, the journaling means of said rod including devices for sustaining the end thrust imposed on the latter, said devices being adjustable.

24. The combination set forth in claim 24 distinguished in that said nut and said bearing of the rotatable rod are adapted to accommodate the arcuate movements of said upright carriers, and that the means for rotating said rod are operable from a distant point.

EDWARD P. ARMSTRONG.